(12) United States Patent
Weaver et al.

(10) Patent No.: US 6,937,351 B1
(45) Date of Patent: Aug. 30, 2005

(54) NON-DESTRUCTIVE METHOD OF MEASURING THE THICKNESS OF A SEMICONDUCTOR WAFER

(75) Inventors: Kevin Weaver, San Jose, CA (US); Zachary Joshua Gemmill, Mountain View, CA (US); Steven Jacobson, Dublin, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 215 days.

(21) Appl. No.: 10/287,326

(22) Filed: Nov. 4, 2002

(51) Int. Cl.[7] ............................................. G01B 11/06
(52) U.S. Cl. ...................................... 356/630; 356/614
(58) Field of Search ................................ 356/630–632, 356/614; 250/559.08, 559.27, 559.4; 438/7

(56) References Cited

U.S. PATENT DOCUMENTS

| | | | | |
|---|---|---|---|---|
| 3,804,523 A | * | 4/1974 | McCormack | 356/124 |
| 4,120,590 A | * | 10/1978 | Bieringer et al. | 356/632 |
| 4,674,883 A | * | 6/1987 | Baurschmidt | 356/630 |
| 4,844,617 A | * | 7/1989 | Kelderman et al. | 356/624 |
| 4,920,273 A | * | 4/1990 | Sacks et al. | 250/559.08 |
| 5,747,813 A | * | 5/1998 | Norton et al. | 250/372 |
| 6,069,366 A | * | 5/2000 | Goruganthu et al. | 250/559.27 |
| 6,172,752 B1 | * | 1/2001 | Haruna et al. | 356/503 |
| 6,368,881 B1 | | 4/2002 | Brouillette et al. | 438/7 |
| 6,721,058 B2 | * | 4/2004 | Kim et al. | 356/630 |

FOREIGN PATENT DOCUMENTS

JP         10-268203        * 10/1998

* cited by examiner

*Primary Examiner*—Hoa Q. Pham
(74) *Attorney, Agent, or Firm*—Mark C. Pickering

(57) ABSTRACT

The thickness of a semiconductor wafer is non-destructively measured using infrared (IR) microscopy. The wafer is placed on a stage. A distance between the stage and a detector is then varied so that a first image of the wafer is focused on the detector. When focused, a first separation distance is measured. The distance between the stage and the detector is again varied so that a second image is focused on the detector. When again focused, a second separation distance is measured. The difference between the first and second separation distances is then determined and multiplied by the refractive index of light in silicon.

20 Claims, 4 Drawing Sheets

NON-DESTRUCTIVE METHOD OF MEASURING THE THICKNESS OF A SEMICONDUCTOR WAFER

BACKGROUND OF THE INVENTION

1. Field of the Invention

The present invention relates to a method of measuring the thickness of a semiconductor wafer and, more particularly, to a method of non-destructively measuring the thickness of the wafer.

2. Description of the Related Art

The final back-end processing steps of a semiconductor wafer commonly include the steps of bumping the wafer (adding solder bumps to the pads formed on the top surface of the wafer), and back grinding the wafer (removing a portion of the back side of the wafer to reduce the thickness of the wafer).

Before a wafer is accepted, the wafer is typically measured to insure that the thickness of the wafer falls within a specified range of values. One approach to measuring the thickness of the wafer is to dice the wafer (cut the wafer into a large number of individual die), and then measure the cross-section of a number of die.

A problem with this approach is that if the thickness of the die falls outside of the specified range of values, the die must be discarded. If the thickness of the die could be measured before the wafer is diced, a wafer that is too thick could be ground down some more until the thickness of the wafer falls within the specified range, thereby saving the wafer.

One approach to measuring the thickness of a semiconductor wafer before the wafer is diced is to use calipers. Calipers have a pair of probes, a control unit that adjusts the separation distance between the two probes, and a display unit that displays the current separation distance.

To measure the thickness of a wafer, the wafer is inserted between the two probes, and the control unit reduces the separation distance between the two probes until the two probes make physical contact with the top and bottom surfaces of the wafer. The displayed separation distance then indicates the thickness of the wafer.

One problem with utilizing calipers to measure the thickness of a semiconductor wafer is that, since the probes make physical contact with the top and bottom surfaces of the wafer, the probes can cause the wafer to crack. The probes can also smear the solder bumps, and scratch the surface of the passivation layer. Thus, there is a need for a non-destructive method of measuring the thickness of a semiconductor wafer.

DETAILED DESCRIPTION OF THE INVENTION

Figure 1:
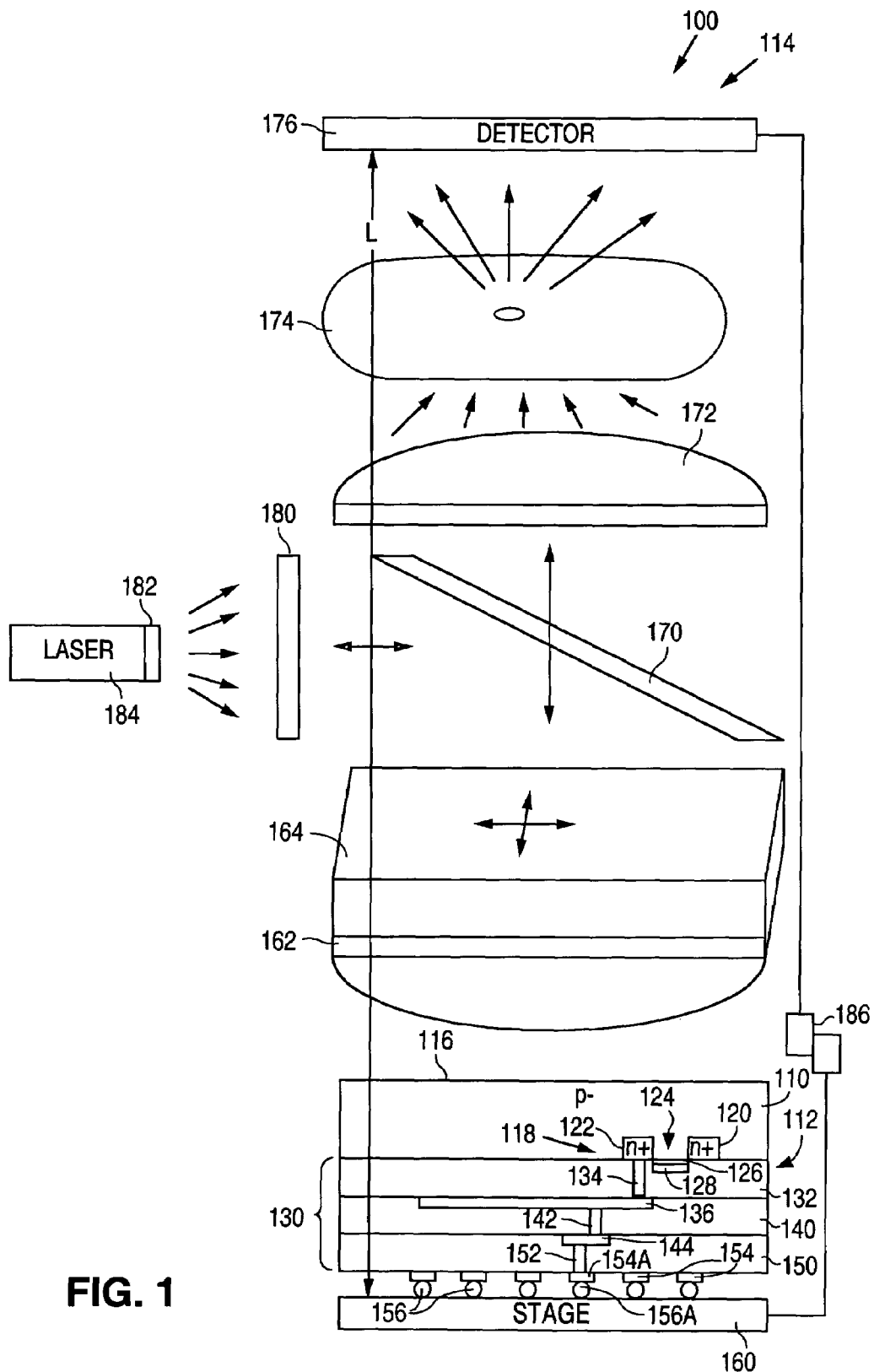
FIG. 1 is a cross-sectional and block diagram illustrating an example of a wafer measuring system 100 in accordance with the present invention.

FIG. 1 shows a cross-sectional and block diagram that illustrates an example of a wafer measuring system 100 in accordance with the present invention. As described in greater detail below, the present method non-destructively measures the thickness of a semiconductor wafer using infrared (IR) microscopy.

As shown in FIG. 1, system 100 includes a to-be-measured wafer 110 that includes an electrical circuit 112, and an infrared (IR) microscope 114 that is used to measure the thickness of wafer 110. Wafer 110, which is shown in a flipped condition, has a p-type conductivity and a bottom surface 116. (N-type wafers can also be used. In addition, circuit 112 can include NMOS, PMOS, or both NMOS and PMOS transistors.)

As further shown in FIG. 1, electrical circuit 112 includes a NMOS transistor 118 that has spaced-apart n+ source and drain regions 120 and 122, respectively, that are formed in wafer 110, and a channel region 124 that is located between source and drain regions 120 and 122. NMOS transistor 118 also has a layer of gate oxide 126 that is formed on substrate 114 below channel region 124, and a gate 128 that is formed below channel region 124 on gate oxide layer 126.

In addition, circuit 110 also includes an interconnect structure 130 that is formed on wafer 110 to contact NMOS transistor 118. In the example shown in FIG. 1, interconnect structure 130 includes a first layer of isolation material 132 that is formed on wafer 110 and NMOS transistor 118, and a contact 134 that is formed through isolation layer 132 to make an electrical connection with drain region 122.

Interconnect structure 130 further includes a metal-1 trace 136 (formed from a metal-1 layer) that is formed on isolation layer 132 to make an electrical connection with contact 134, and a second layer of isolation material 140 that is formed on isolation layer 132 and metal-1 trace 136.

Interconnect structure 130 additionally includes a via 142 that is formed through isolation layer 140 to make an electrical connection with metal-1 trace 136, and a metal-2 trace 144 that is formed on isolation layer 140 to make an electrical connection with via 142. Further, structure 130 includes a third layer of isolation material 150 that is formed on isolation layer 140 and metal-2 trace 144, and a via 152 that is formed through isolation layer 150 to make an electrical connection with metal-2 trace 144.

In addition, wafer 110 includes a number of pads 154 that are formed on isolation layer 150, including a pad 154A that makes an electrical connection with via 152, and a number of solder bumps 156 that are formed on pads 154, including a solder bump 156A that makes an electrical connection with pad 154A. (Although the present example uses only two layers of metal (metal-1 and metal-2), the present invention applies equally to any number of metal layers.)

As further shown in FIG. 1, IR microscope 114 includes a stage 160, such as an optically encoded mechanical stage, a first lens 162, and a scanner 164. In addition, microscope 114 also includes a beam splitter mirror 170, a second lens 172, a pinhole 174, and a detector 176. Detector 176 can include, for example, an array of photodiodes that are sensitive to the IR frequency range.

Microscope 114 further includes a third lens 180, a fourth lens 182, and an IR source 184 that outputs light in near infrared wavelengths such as, for example, wavelengths of 1064 nM or 1152 nM. Microscope 114, which can be implemented with, for example, a Zeiss Laser Scan Microscope (LSM), additionally includes an adjustable base 186 that varies a length L between stage 160 and detector 176 by moving the position of stage 160 relative to the position of detector 176.

In operation, light from IR source 184 passes through lens 182 and lens 180, and is reflected by mirror 170 through scanner 164 and lens 162 to illuminate wafer 110 with near infrared wavelengths. The light reflected from wafer 110 passes back through lens 162 and scanner 164, and passes through mirror 170 which is only partially silvered. The light then passes through lens 172 and pinhole 174 to detector 176 that receives an image of wafer 110.

Figure 2:
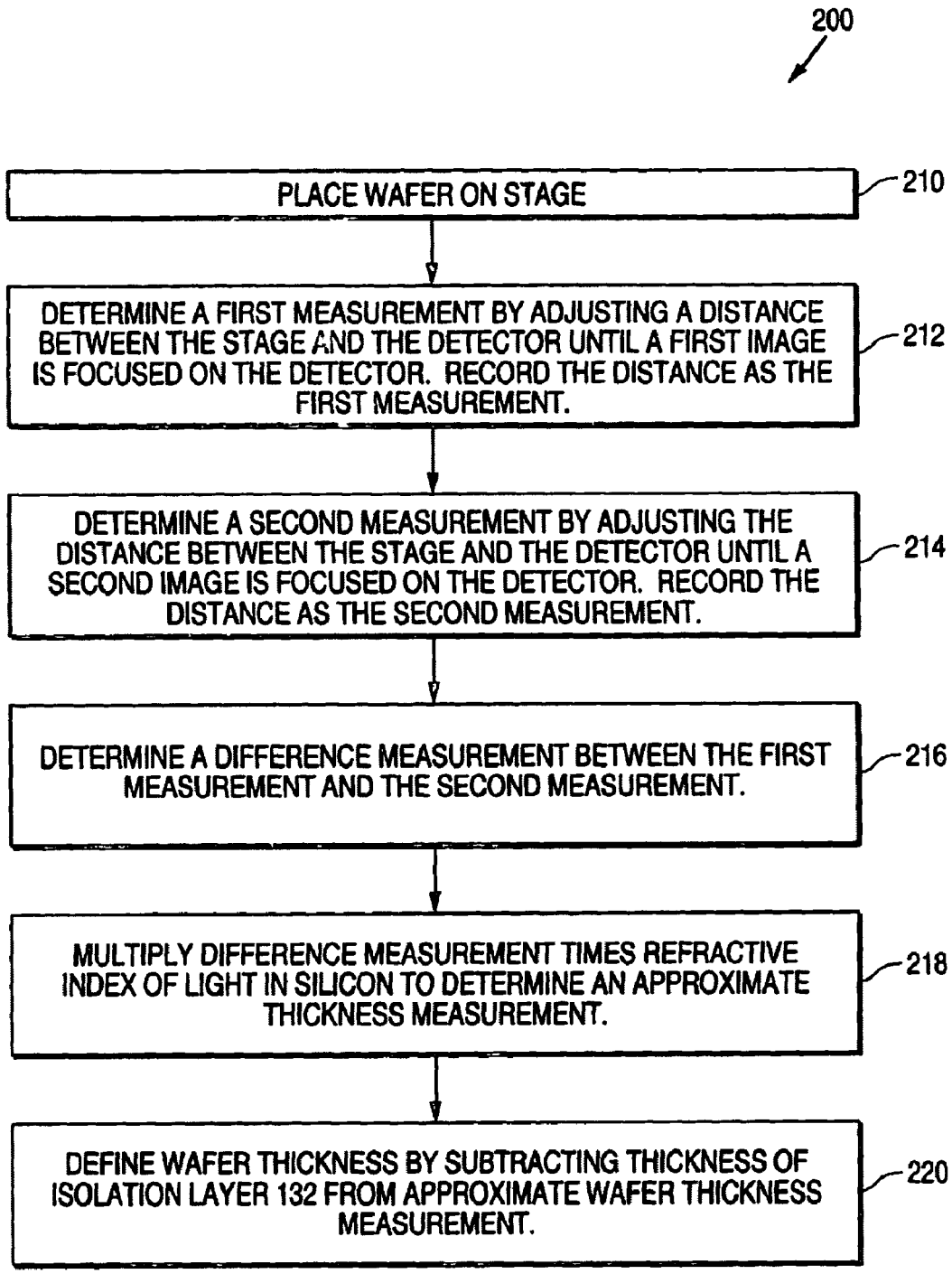
FIG. 2 is a flow chart illustrating an example of a method 200 of measuring the thickness of wafer 110 in accordance with the present invention.

FIG. 2 shows a flow chart that illustrates an example of a method 200 of measuring the thickness of wafer 110 in accordance with the present invention. As shown in FIG. 2, method 200 begins at step 210 by placing wafer 110 on stage 160 of microscope 114. In the example shown in FIG. 1, wafer 110 is flipped so that solder balls 156 rest on stage 160.

Next, method 200 moves to step 212 to determine a first measurement. To determine the first measurement, the distance between stage 160 and detector 176 is adjusted via base 186 to obtain a focal length FL that allows an image of the bottom surface 116 of wafer 110 to be focused on detector 176. The image can be focused on, for example, imperfections on the bottom surface 116, such as scratches from back grinding. Once the image has been focused, the stage-to-detector length L is recorded as the first measurement.

Figure 3A:
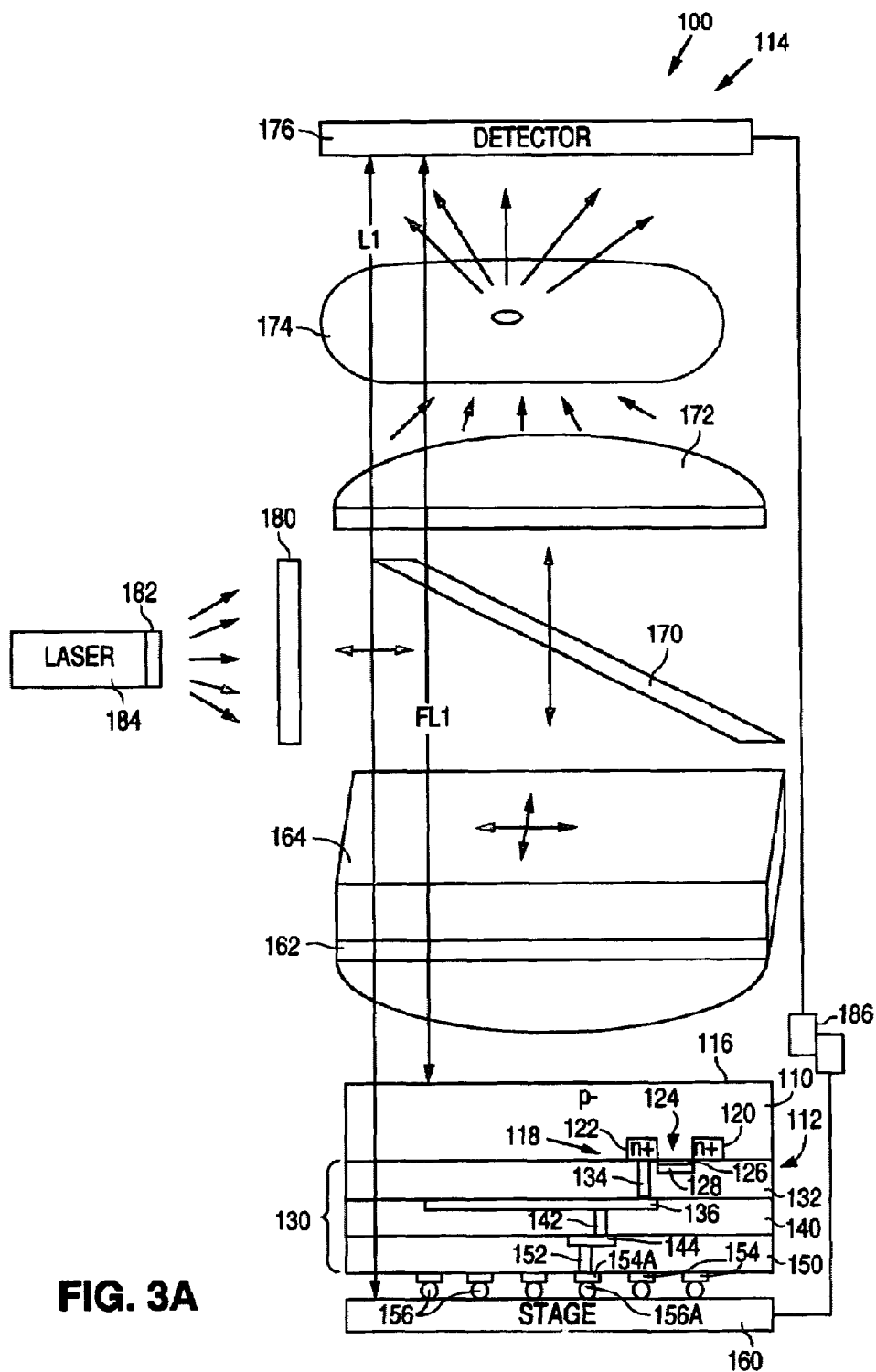
FIG. 3A is a cross-sectional and block diagram illustrating step 212 with measuring system 100 in accordance with the present invention.

FIG. 3A shows a cross-sectional and block diagram that illustrates step 212 with measuring system 100 in accordance with the present invention. As shown in FIG. 3A, the distance between stage 160 and detector 176 is varied to obtain a focal length FL1 that allows an image of the bottom surface 116 of wafer 110 to be focused on detector 176. Following this, a stage-to-detector length L1 is recorded as the first measurement.

After the first measurement has been recorded, method 200 moves to step 214 to determine a second measurement. To determine the second measurement (through the bottom surface 116 of wafer 110), the distance between stage 160 and detector 176 is adjusted via base 186 to obtain a focal length FL that allows an image of circuit 112 to be focused on detector 176. Once the image is focused, the stage-to-detector length L is recorded as the second measurement. (The X-Y position of wafer 110 does not move between measurements.)

The image of the circuit can be, for example, an image of the bottom sides of the metal-1 traces, such as metal-1 trace 136. Microscope 114 can focus on and form an image of the bottom sides of the metal-1 traces because the silicon of wafer 110 is relatively transparent to IR light, while the metal of the metal-1 traces is not transparent to IR light.

Silicon is relatively transparent to IR light if the thickness is relatively thin. In the present invention, the bottom side 116 of wafer 110 has been ground down to have a thickness that is relatively transparent to IR light using conventional fabrication steps prior to being placed on stage 160.

Figure 3B:
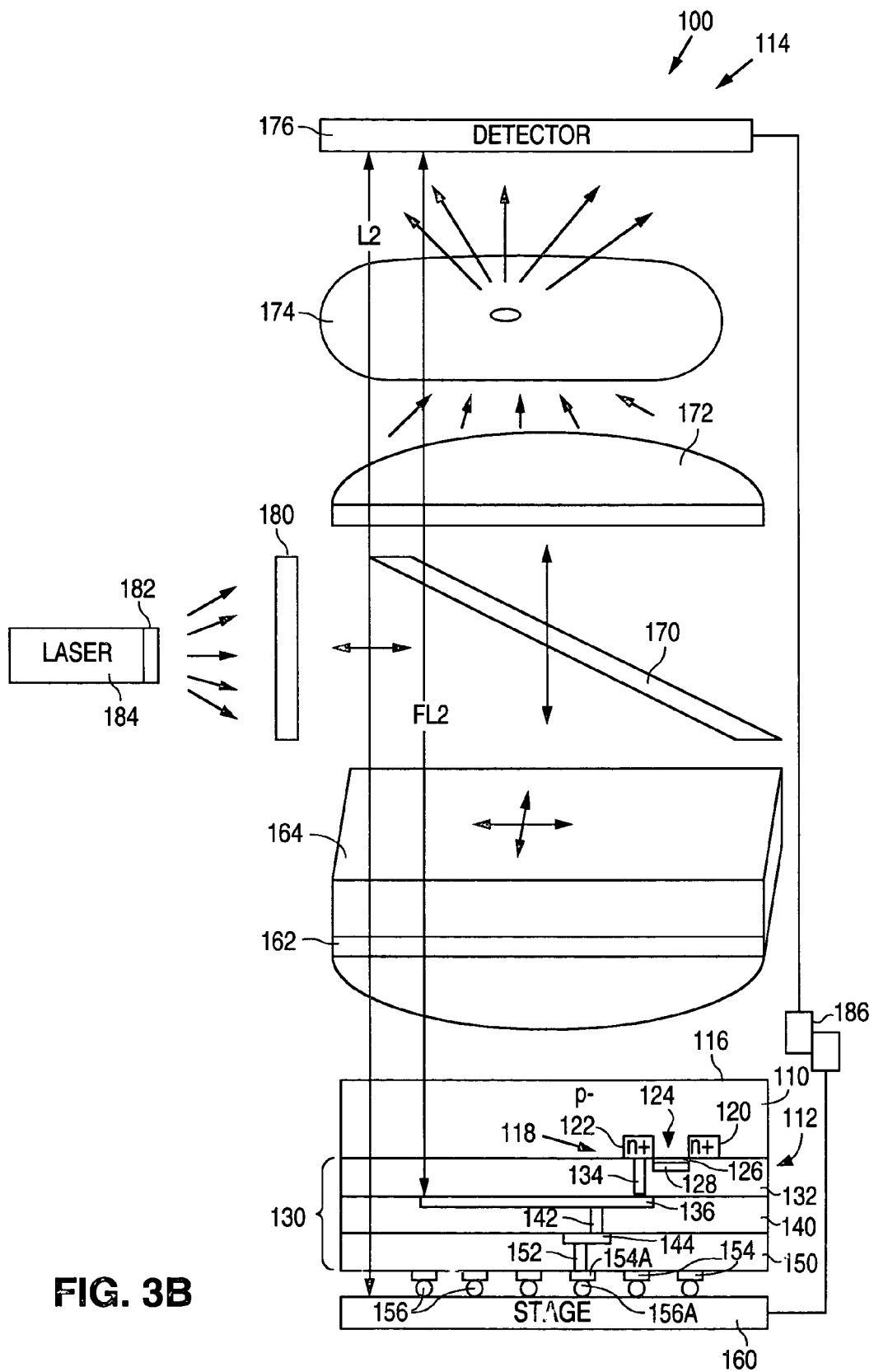
FIG. 3B is a cross-sectional and block diagram illustrating step 214 with measuring system 100 in accordance with the present invention.

FIG. 3B shows a cross-sectional and block diagram that illustrates step 214 with measuring system 100 in accordance with the present invention. As shown in FIG. 3B, the distance between stage 160 and detector 176 is varied to obtain a focal length FL2 that allows an image of the bottom surface of metal-1 trace 136 to be focused on detector 176. Following this, a stage-to-detector length L2 is recorded as the second measurement. (Objects other than the bottom side of a metal-1 trace of circuit 112, such as the bottom side of a metal trace from another metal layer, can alternately be used as a point of focus.)

After the second measurement has been recorded, method 200 moves to step 216 to determine a difference measurement. The difference measurement is determined by subtracting the first measurement from the second measurement. Once the difference measurement has been determined, method 200 moves to step 218 to multiply the difference measurement by 3.5, the refractive index of light in silicon, to determine a thickness measurement between the bottom side 116 of wafer 110 and the bottom side of metal-1 trace 136.

For some applications, such as quality assurance measurements, where a relatively wide range of wafer thicknesses are acceptable, method 200 can end at step 218. However, when more precise measurements are required, method 200 moves to step 220 to subtract the thickness of isolation layer 132 from the thickness measurement to form a final wafer thickness measurement.

The following table shows experimental data that was taken from a test wafer.

TABLE

| Test | Bottom Side | | Avg | Circuit Side | | Avg | IR Thick | X-sec Thick | Delta |
|---|---|---|---|---|---|---|---|---|---|
| 1 | 2081 | 2083 | 2082 | 1985 | 1985 | 1985 | 339.5 | 344 | 4.5 |
| 2 | 2051 | 2051 | 2051 | 1959 | 1958 | 1958.5 | 323.75 | 342 | 18.25 |
| 3 | 2065 | 2064 | 2064.5 | 1972 | 1970 | 1971 | 327.25 | 337 | 9.75 |
| 4 | 1994 | 1994 | 1994 | 1896 | 1898 | 1897 | 339.5 | 343 | 3.5 |
| 5 | 1985 | 1984 | 1984.5 | 1889 | 1892 | 1890.5 | 329 | 342 | 13 |
| 6 | 2006 | 2007 | 2006.5 | 1908 | 1916 | 1912 | 330.75 | 347 | 16.25 |
| 7 | 2030 | 2028 | 2029 | 1932 | 1929 | 1930.5 | 344.75 | 346 | 1.25 |
| 8 | 1872 | 1871 | 1871.5 | 1775 | 1773 | 1774 | 341.25 | 345 | 3.75 |
| 9 | 1871 | 1871 | 1871 | 1775 | 1771 | 1773 | 343 | 347 | 4 |
| 10 | 1882 | 1880 | 1881 | 1784 | 1786 | 1785 | 336 | 347 | 11 |

As shown in the table, 10 sites on a wafer were each measured two times to determine an average bottom side measurement and an average top side measurement. The difference values were then determined, and multiplied by 3.5 to determine an IR measured thickness. In addition, cross-sectionals of the wafer at the same 10 sites were also measured to determine a cross-sectional (X-sec) thickness. As shown in the table, the measurements were between 20 microns between the two techniques.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of measuring the thickness of an object that has an exterior surface, the method comprising the steps of:
   placing the object on a stage;
   determining a first measurement by adjusting a distance between the stage and a detector until a first image of the exterior surface is focused on the detector, and recording the distance as the first measurement;
   determining a second measurement by adjusting the distance between the stage and the detector until a second image is focused on the detector, and recording the distance as the second measurement, the second image being of a structure that lies within the object and is spaced apart from the exterior surface; and
   determining a difference measurement between the first measurement and the second measurement.

2. The method of claim 1 wherein the first image is an image of the bottom surface of the object.

3. The method of claim 2 wherein the second image is an image of a metal region.

4. The method of claim 1 wherein the object includes a semiconductor wafer.

5. A method of measuring the thickness of a semiconductor wafer that includes a front surface, a back surface, and an electrical circuit that is formed on the front surface, the method comprising the steps of:
   placing the semiconductor wafer on a stage of a microscope;
   determining a first measurement by adjusting a distance between the stage and a detector until a first image of the wafer is focused on the detector, and recording the distance as the first measurement, the first image being an image of the bottom surface of the semiconductor wafer;
   determining a second measurement by adjusting the distance between the stage and the detector until a second image is focused on the detector, and recording the distance as the second measurement, the first and second images being different, the second image being an image of the electrical circuit formed on the front surface of the semiconductor wafer;
   determining a difference measurement between the first measurement and the second measurement;
   wherein the electrical circuit includes:
   a layer of isolation material that is formed on the top surface of the semiconductor wafer;
   a contact that is formed through the isolation layer to make a connection with the top surface of the semiconductor wafer; and
   a metal-1 trace formed on the layer of isolation material to make an electrical connection with the contact.

6. The method of claim 5 wherein the image of the circuit includes an image of a bottom surface of the metal-1 trace.

7. The method of claim 6 and further comprising the step of multiplying the difference measurement times a refractive index of light in the wafer to determine an approximate thickness measurement.

8. The method of claim 7 wherein a thickness of the layer of isolation material is subtracted from the approximate thickness measurement to define a wafer thickness.

9. The method of claim 8 wherein the semiconductor wafer has a first conductivity type, and the electrical circuit includes spaced apart source and drain regions of a second conductivity type that are formed in the semiconductor wafer, the contact making an electrical connection with the drain region.

10. The method of claim 5 and further comprising the step of illuminating the semiconductor wafer with an IR light source, light reflected from the semiconductor wafer passing through a lens to be focused on the detector.

11. The method of claim 5 wherein the electrical circuit further includes a plurality of solder balls, a solder ball of the plurality of solder balls being electrically connected to the metal-1 trace.

12. The method of claim 11 wherein the solder balls touch the stage when the first measurement is recorded.

13. The method of claim 5 wherein the stage and the detector are connected to an adjustable base that varies a distance between the stage and the detector.

14. A method of measuring a thickness of an object that has a top surface and a bottom surface, the method comprising the steps of:
   placing the object on a stage;
   adjusting a spacing between the stage and a detector until a first image is focused on the detector, the first image being of a structure that lies within the object, a first distance from the detector, and is spaced apart from the top surface and the bottom surface;
   adjusting a spacing between the stage and the detector until a second image is focused on the detector, the second image being a second distance from the detector;
   determining a difference value between the first and second distances.

15. The method of claim 14 wherein the structure includes a metal region.

16. The method of claim 15 wherein the metal region includes a metal trace, the metal trace contacting a layer of semiconductor isolation material.

17. The method of claim 16 wherein the second image is an image of a surface.

18. The method of claim 16 wherein the second distance is less than the first distance.

19. A method of measuring a thickness of an object that has a top surface and a bottom surface, the method comprising the steps of:
   placing the object on a stage;
   adjusting a spacing between the stage and a detector until a first image is focused on the detector, the first image being of a structure that lies within the object, a first distance from the detector, and is spaced apart from the top surface and the bottom surface, the structure including a metal region;
   adjusting a spacing between the stage and the detector until a second image is focused on the detector, the second image being a second distance from the detector;
   determining a difference value between the first and second distances; and
   multiplying the difference value times a refractive index of light in a semiconductor material to determine a thickness measurement.

20. The method of claim 19 wherein the difference value is a positive value.

* * * * *